US010102753B2

(12) United States Patent
Bailey et al.

(10) Patent No.: US 10,102,753 B2
(45) Date of Patent: Oct. 16, 2018

(54) SYSTEMS AND METHODS FOR PROCESSING FLIGHT INFORMATION

(75) Inventors: Louis J. Bailey, Covington, WA (US); Ryan D. Hale, Kent, WA (US)

(73) Assignee: The Boeing Company, Chicago, IL (US)

( * ) Notice: Subject to any disclaimer, the term of this patent is extended or adjusted under 35 U.S.C. 154(b) by 1512 days.

(21) Appl. No.: 13/250,241

(22) Filed: Sep. 30, 2011

(65) Prior Publication Data

US 2013/0085669 A1 Apr. 4, 2013

(51) Int. Cl.
*B60T 7/12* (2006.01)
*G08G 5/00* (2006.01)

(52) U.S. Cl.
CPC ......... *G08G 5/0013* (2013.01); *G08G 5/0039* (2013.01); *G08G 5/0091* (2013.01)

(58) Field of Classification Search
CPC combination set(s) only.
See application file for complete search history.

(56) References Cited

U.S. PATENT DOCUMENTS 5,208,590 A * 5/1993 Pitts .............................. 340/973
6,122,572 A * 9/2000 Yavnai ............................ 701/23
6,522,958 B1 2/2003 Dwyer et al.
7,349,773 B2 3/2008 Berard
7,433,779 B2 10/2008 Deker et al.
7,797,102 B2 9/2010 Fortier
2002/0039072 A1 4/2002 Gremmert et al.
2003/0030581 A1* 2/2003 Roy ................................ 342/36
2007/0162197 A1 7/2007 Fleming
2008/0177432 A1* 7/2008 Deker et al. .................... 701/17
2008/0255714 A1 10/2008 Ross
2008/0288164 A1 11/2008 Lewis et al.
2008/0300739 A1 12/2008 Coulmeau et al.
2009/0012663 A1 1/2009 Mead et al.
2009/0094011 A1* 4/2009 Griffin et al. ..................... 703/8
2009/0157288 A1 6/2009 Bailey et al.
(Continued)

FOREIGN PATENT DOCUMENTS

EP 2290636 A1 2/2011

OTHER PUBLICATIONS

Extended European Search Report and Opinion in European Application No. 12185485.5, dated Dec. 13, 2013.

*Primary Examiner* — Redhwan K Mawari
(74) *Attorney, Agent, or Firm* — Ostrager Chong Flaherty & Broitman P.C.

(57) ABSTRACT

Systems and methods for processing flight information. Using a flight plan/route message and other flight information (aircraft type and navigation database information), the portion of the message containing the flight plan or route is decoded and translated to construct a ground-based flight route comprising a list of waypoints and associated flight information. The list of waypoints may then used in calculations performed by a flight trajectory predictor to identify spatially associated weather information and/or to create an updated flight plan or route (e.g., by adding or changing waypoints in a flight object) and thereafter transmit that information to users. Prior to transmitting any updated flight plan/route, the associated waypoints and other flight information must be translated and encoded into the required format for inclusion in an outgoing (i.e., uplinked) flight plan/route message.

19 Claims, 4 Drawing Sheets

(56) References Cited

U.S. PATENT DOCUMENTS

| | | | |
|---|---|---|---|
| 2010/0049382 | A1 | 2/2010 | Akalinli et al. |
| 2010/0241345 | A1 | 9/2010 | Cornell et al. |
| 2010/0250117 | A1 | 9/2010 | Deker et al. |
| 2011/0050458 | A1 | 3/2011 | Bailey et al. |
| 2011/0054718 | A1 | 3/2011 | Bailey |

* cited by examiner

SYSTEMS AND METHODS FOR PROCESSING FLIGHT INFORMATION

BACKGROUND

The embodiments disclosed hereinafter generally relate to systems and methods for providing a flight plan with or without environmental information to a user. More particularly, the disclosed embodiments relate systems and methods for providing a flight plan with or without environmental information to a user in response to receipt of current flight information.

Environmental information is used during planning and execution of flight operations. Planning flight operations result in the creation of flight plans. Flight plans are used to document basic information such as departure and arrival points, estimated time en route, various waypoints the aircraft must traverse en route, information pertaining to those waypoints, such as actual or estimated altitude and speed of the aircraft at those waypoints, information relating to legs of the flight between those waypoints, and aircraft predicted performance. This type of flight plan may be used to construct a flight trajectory including the various legs of the flight, which are connected to the various waypoints along the route. This flight trajectory may include a lateral trajectory defined in the horizontal plane and a vertical trajectory defined in the vertical plane. The flight trajectory may also include the element of time across the horizontal and vertical planes.

Environmental information for the route between the departure gate and arrival gate, including information about forecasted and in-situ weather for the various waypoints along the route, may affect a flight trajectory. For example, if incorrect weather is forecasted for a particular waypoint along the route of the flight plan, certain predictions for the flight path may become inaccurate, such as speed, fuel consumption, and time en route.

Additionally, revision of a flight plan may include deleting or adding waypoints, modifying the position of waypoints, or modifying the characteristics pertaining to the waypoints or legs between the waypoints, such as aircraft speed, time of arrival at the waypoint, or altitude. The characteristics for various waypoints or legs between waypoints may further include weather bands. A weather band is a collection of environmental information for a specific spatial point, such as a specific altitude or a specific three- or four-dimensional point in space. Environmental information may include but is not limited to factors such as temperature, pressure, noise, air particulates, humidity, turbulence, wind speed, and wind direction.

Ground operation centers may identify and send weather bands to an aircraft for use in determining how weather may affect flight trajectory calculations. The weather bands identified may be based on current or predicted weather, flight predictions, flight intent or flight plans, or may be default weather bands non-specific to a particular flight trajectory. Actual weather may impact a predicted flight trajectory if the actual weather differs from the predicted weather used to calculate the predicted flight trajectory. Additionally, different factors en route may cause an aircrew to modify the flight plan, and the environmental information from the ground operation center, loaded during preflight, may no longer be accurate or up-to-date for the modified flight plan. Inaccurate or dated environmental information can result in inefficiencies for flight operations, such as an increase in fuel consumption and emissions or delay in flight time, for example.

It is known for an aircraft to request a new flight plan and/or new environmental information from a ground-based operations center or air traffic controller. The downlinked request may be accompanied or followed by current flight route or flight plan information for that aircraft. The downlinked flight route or flight plan information may consist of such items as: a list of waypoints, instrument departure procedures, arrival and departure transitions, airways, Standard Terminal Arrival Routes, fixes and leg types.

More generally, flight information can be received from either a ground source or from an aircraft in the form of a flight message. From a ground source, there is no current solution to decode and translate the flight message into a flight plan type of format because each ground source may specify its own unique format and encryption. For flight messages downlinked from an aircraft, there is a known software tool that can be used to parse the flight message, but nothing to decode and translate the flight message. For the uplink, there are no solutions to translate and encode a list of waypoints and other flight information representing a flight plan/route with or without environmental information.

There is a need for systems and methods for decoding and translating a received flight plan or route and, thereafter, translating and encoding a trajectory or flight plan/route with or without selected environmental information into an outgoing (e.g., uplinked) message for transmission to users. There is a need for systems and methods to be adaptive to multiple variations of incoming and outgoing flight plan/route formats.

SUMMARY

As used herein, the term “flight plan/route” means a flight plan or a flight route. Although the terms flight plan and flight route usually have different meanings (e.g., a flight plan may specify a cruise altitude, but a route does not and is usually limited to a two-dimensional perspective), sometimes these terms are mistakenly defined as the same. In this disclosure, the term “flight plan/route” is used because the system disclosed herein can handle either, interchangeably and independently.

Flight plan/route messages transmitted from aircraft and ground sources need to be decoded, translated and encoded for use in processing flight plan, trajectory and environmental messaging solutions. The solution must be adaptive to multiple variations of transmission and multiple formats: aircraft-to-aircraft, aircraft-to-ground, ground-to-aircraft and ground-to-ground communications. The solution must also be adaptive to the multiple variations for uplinking and crosslinking to various users. As an example, the solution would be translated and encoded one way for a particular airplane model and another way for a different airplane model. The solution must consider the end user.

Using a downlinked flight plan/route message from an aircraft, other flight information (i.e. aircraft type, cruise altitude, planned speed schedule, aircraft state data, airline) and/or navigation database information, the portion of the downlinked message containing the flight plan or route is decoded and translated to construct a ground-based flight route comprising a list of waypoints. The list of waypoints may then be used in calculations performed by a flight trajectory predictor to identify spatially associated environmental information and/or to create an updated flight plan or route (e.g., by adding or changing waypoints in a flight object) and thereafter transmit that information to users. Prior to transmitting any flight plan/route, the flight plan/route waypoints in the updated flight object must be translated and encoded into the required format for inclusion in an outgoing (e.g., uplinked) flight plan/route message.

One aspect of the invention is a system for processing flight information comprising a flight object, and a flight plan/route processor capable of communicating with a navigation database and the flight object. The flight plan/route processor is programmed to perform the following operations: (a) obtaining a flight plan/route message comprising payload data representing a flight plan/route of an aircraft; (b) parsing the payload data in the obtained flight plan/route message to extract flight information; (c) decoding components of the flight information to derive a list of waypoints and associated flight information; (d) storing the list of waypoints and associated flight information in the flight object; and (e) translating the list of waypoints in the flight object into a list of waypoints suitable for use by a user.

Another aspect of the inventions is a system for processing flight information comprising: a flight object that stores a list of waypoints associated with a flight plan/route of an aircraft; and a flight plan/route processor capable of communicating with a navigation database and the flight object. The flight plan/route processor is programmed to perform the following operations: (a) translating the list of waypoints into a sequence of flight information comprising waypoints, flight levels, fixes, transitions, airways and flight procedures, the sequence of flight information representing the flight plan/route for the aircraft; (b) encoding the sequence of flight information to form message payload data having a specified format associated with the aircraft or an airline operating the aircraft; (c) constructing a flight plan/route message that includes the message payload data; and (d) making available the flight plan/route message with or without environmental information.

A further aspect of the invention is a method for processing flight information comprising: (a) obtaining a flight plan/route message comprising payload data representing a flight plan/route of an aircraft; (b) processing the payload data representing the flight plan/route to derive a list of waypoints and associated flight information in a form suitable for use by a user; (c) processing the list of waypoints and associated flight information to derive payload data representing an updated flight plan/route of the aircraft; (d) constructing an updated flight plan/route message that includes the payload data representing the updated flight plan/route; and (e) making available the updated flight plan/route message with or without environmental information.

Yet another aspect of the invention is a system for processing flight information, comprising a processor programmed to perform the following operations: (a) obtaining a flight plan/route message comprising payload data representing a flight plan/route of an aircraft; (b) processing the payload data representing the flight plan/route to derive a list of waypoints and associated flight information in a form suitable for use by a user; (c) processing the list of waypoints and associated flight information to derive payload data representing an updated flight plan/route of the aircraft; (d) constructing an updated flight plan/route message that includes the payload data representing the updated flight plan/route; and (e) making available the updated flight plan/route message with or without environmental information.

Other aspects of the invention are disclosed and claimed below.

BRIEF DESCRIPTION OF THE DRAWINGS

Various embodiments will be hereinafter described with reference to drawings for the purpose of illustrating the foregoing and other aspects of the invention.

Reference will hereinafter be made to the drawings in which similar elements in different drawings bear the same reference numerals.

DETAILED DESCRIPTION

Although exemplary embodiments are disclosed in detail below, various changes may be made and equivalents may be substituted for elements thereof without departing from the scope of the invention. In addition, many modifications may be made to adapt a particular situation to the teachings of the invention without departing from the essential scope thereof. Therefore it is intended that the invention not be limited to the particular embodiments disclosed hereinafter.

Various digital datalink systems for transmission of messages between aircraft and ground stations via radio or satellite are known, including the Aircraft Communications Addressing and Reporting System (ACARS). ACARS-equipped aircraft have an avionics computer called an AGARS Management Unit (MU), which is directly interfaced to a Control Display Unit (CDU) in the flight deck. There is a datalink interface between the ACARS MU and the flight management system (FMS). This interface enables flight plans and environmental information to be sent from ground to the ACARS MU, which then forwards the received information to the FMS. This feature enables an airline to update a flight plan during flight and allows the flight crew to evaluate new weather conditions or alternate flight plans. Each airline has its own unique ACARS application operating on its aircraft. In addition, since each airline's ground computers are different, the content and format of messages sent by an AGARS MU differs for each airline and each aircraft type.

For example, it is known how to provide weather report uplink messages from the ground to an aircraft. In response to an AGARS downlink message from the aircraft requesting environmental information, a weather report is constructed by the ground operator's computer system. This message comprises a header containing an aircraft identifier, security related information and a body (i.e., payload) containing the environmental information. In a similar manner, an FMS of an aircraft may send a flight plan change request, in which case the response would be a message containing the aircraft identifier, security information and an updated flight plan. In either case, a message is sent from the airline's computer system to the flight services ground operator's main computer system via a datalink service. The datalink service provider then transmits the message over its ground network to a remote ground station that broadcasts the message to the aircraft. The MU onboard the aircraft then validates the aircraft identifier and either processes the message or forwards it to the FMS for processing.

Figure 1:
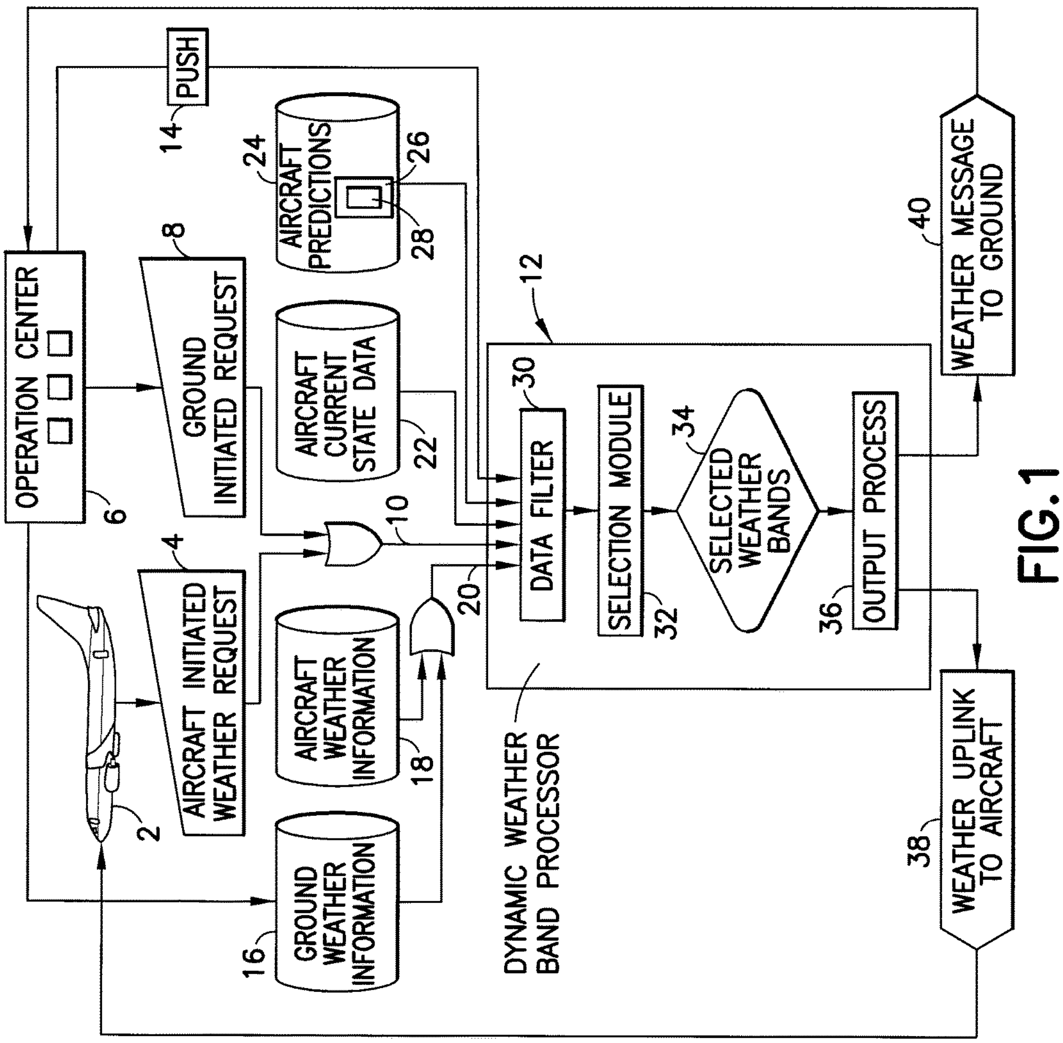
FIG. 1 is a block diagram showing a system for dynamic weather band selection which relies on the flight information decoding/encoding scheme disclosed herein.

FIG. 1 depicts a known system for uplinking weather information to an aircraft. This system processes requests 10 using a data processing system comprising one or more computers or processors. In particular, the data processing system comprises a dynamic weather band processor 12 that is configured to choose climb, cruise, and descent weather that are specific to a particular flight trajectory or flight plan.

The dynamic weather band processor 12 can continually evaluate information received in order to dynamically select weather for a given flight plan. Alternatively, dynamic weather band processor 12 may be triggered to evaluate information by receipt of a request 10, push 14, or some other event to dynamically select weather bands for a particular flight plan. Request 10 may be either a weather request 4 initiated by an aircraft 2 or a request 8 initiated by a ground-based operation center 6. Request 10 may include a specific flight plan, which dynamic weather band processor 12 will use to dynamically select weather bands for the specific flight plan in response to request 10. Push 14 may be an automatic push (from the operation center 6) of a flight plan to dynamic weather band processor 12 to calculate a new weather solution before any request is made by an aircraft. As additional illustrative examples, the trigger event may be receipt of updated weather information, a change in a flight plan, or some other suitable event.

Dynamic weather band processor 12 may receive information from a number of databases, such as ground weather information 16, aircraft weather information 18, aircraft current state data 20, and aircraft predictions 22. Processor 12 may also receive information directly from a number of aircraft and/or operation centers, such as aircraft 2 and operation center 6 shown in FIG. 1.

Ground weather information 16 may include, for example, information collected from weather sources, information about weather local to a particular operation center, forecasted weather information for a number of locations. Aircraft weather information 18 may include weather directly reported or derived from a number of aircraft, such as aircraft 2 in FIG. 1.

Aircraft current state data 22 includes information pertaining to a number of aircraft. Aircraft current state data 22 may include an identifier for an aircraft and current state information about that particular aircraft, such as, without limitation, on-ground, climbing, cruising, descending, altitude, heading, weight, center of gravity, speed, and/or any other suitable state data.

Aircraft predictions 24 may include a number of flight plans and associated predictions for the trajectory and weather of an aircraft based on each of the number of trajectories associated with respective flight plans. Aircraft predictions 24 includes aircraft state data predictions associated with a number of points in time based on predicted weather, flight plan, weight of aircraft, aircraft configuration, and/or any other suitable information. Aircraft predictions 24 may include a number of trajectories 26. These flight trajectories are calculated from flight path information provided from either an aircraft or a ground source using flight path restrictions, such as altitude, speed, and/or time, and planned flight events, such as gear extension.

Dynamic weather band processor 12 gathers information for evaluation from the above-described sources and passes it to a data filter 30, which outputs filtered information to a selection module 32. Data filter 30 may filter in accordance with filtering rules as is described in more detail in U.S. Patent Application Publ. No. 2011/0054718.

Selection module 32 processes the filtered information from data filter 30 and applies selection criteria to an aircraft trajectory received. For example, a trajectory 26 may be received from the aircraft predictions database 28. Selection module 32 uses selection criteria to determine the weather information pertinent to the received trajectory. The selection criteria may include, without limitation, trajectory prediction, atmospheric pressures, temperatures, humidity, wind, events, and number of recipients. Selection module 32 uses the trajectory prediction to predict how the received trajectory may change from its flight plan based on weather information 20 included in the filtered information from data filter 30.

Selection module 32 dynamically selects weather bands based on selection criteria associated with request 10 or push 14. The selected weather bands 34 may include a number of altitude weather bands ranked in order of importance and/or impact to the trajectory being considered from request 10. The selected weather bands 34 are then sent to output process 36, which determines how and where selected weather bands 34 should be sent. Output process 36 determines the recipient of selected weather bands 34 and formats them in dependence on the requirements of the recipient. For example, aircraft 2 may be configured to receive standard aircraft communications addressing and reporting system (ACARS) messaging.

Selected weather bands 34 may be sent to ground station 6, aircraft 2, or other recipients, such as an air navigation service provider. For example, selected weather bands 34 may be formatted for transmission and sent as a weather uplink 38 to aircraft 2. In another example, selected weather bands 34 may be formatted for transmission and sent as weather message 40 to operation center 6.

The above-described process may be initiated by a request from any qualified subscriber of the weather band selection system. In other advantageous embodiments, manual and automatic triggers can be used to reinitialize the process given a new set of conditions, e.g., flight plan modifications. For example, one weather solution may have been computed according to the initial flight path of an aircraft, but the aircrew or a subscriber desires to view the solution using a different flight path before executing that maneuver. A request may be sent with a new proposed flight plan and a new solution may be generated.

In an exemplary system, the weather band selection is associated with a flight trajectory 28 (see FIG. 1). That trajectory may have a number of associated waypoints for which weather information may be dynamically selected. The weather band selection process may produce a number of associated weather bands which include weather information specific to respective waypoints of the trajectory. The weather information specific to a particular waypoint may include, for example, without limitation, altitude or range of altitudes, temperature, wind direction, wind speed, and/or any other weather information for that waypoint. The weather information provided by weather band selection may be assessed along the known and intended trajectory for the flight plan to determine the impact of the weather on that trajectory.

Figure 2:
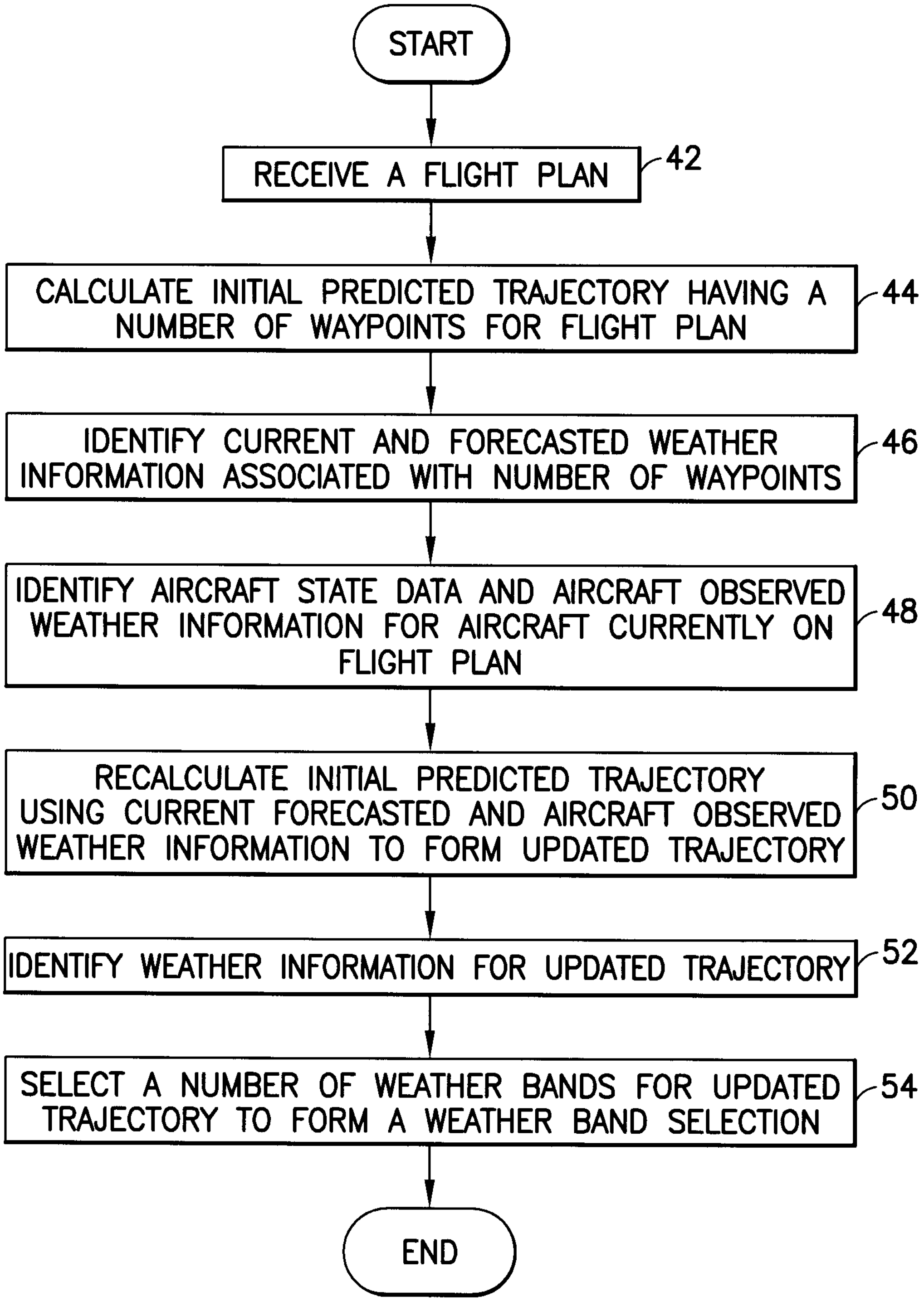
FIG. 2 is a flowchart showing a process for selecting weather bands based in part on receipt of a flight plan which has been decoded in accordance with one embodiment disclosed herein.

The dynamic weather band selection process may occur while an aircraft is in flight or on the ground. Referring to FIG. 2, the process begins by receiving a flight plan (operation 42). The process calculates an initial predicted trajectory having a number of waypoints for the flight plan (operation 44). The process then identifies current and forecasted weather information associated with those waypoints (operation 46). The process identifies aircraft state data and aircraft observed weather information for an aircraft currently on the flight plan (operation 48). Next, the process recalculates the initial predicted trajectory using the current and forecasted weather information and the aircraft observed weather information to form an updated trajectory (operation 50). The process identifies weather information for the updated trajectory (operation 52). The process then selects a number of weather bands for the updated trajectory to form a weather band selection (operation 54). The weather band selection is then included in an uplinked weather report.

Figure 3:
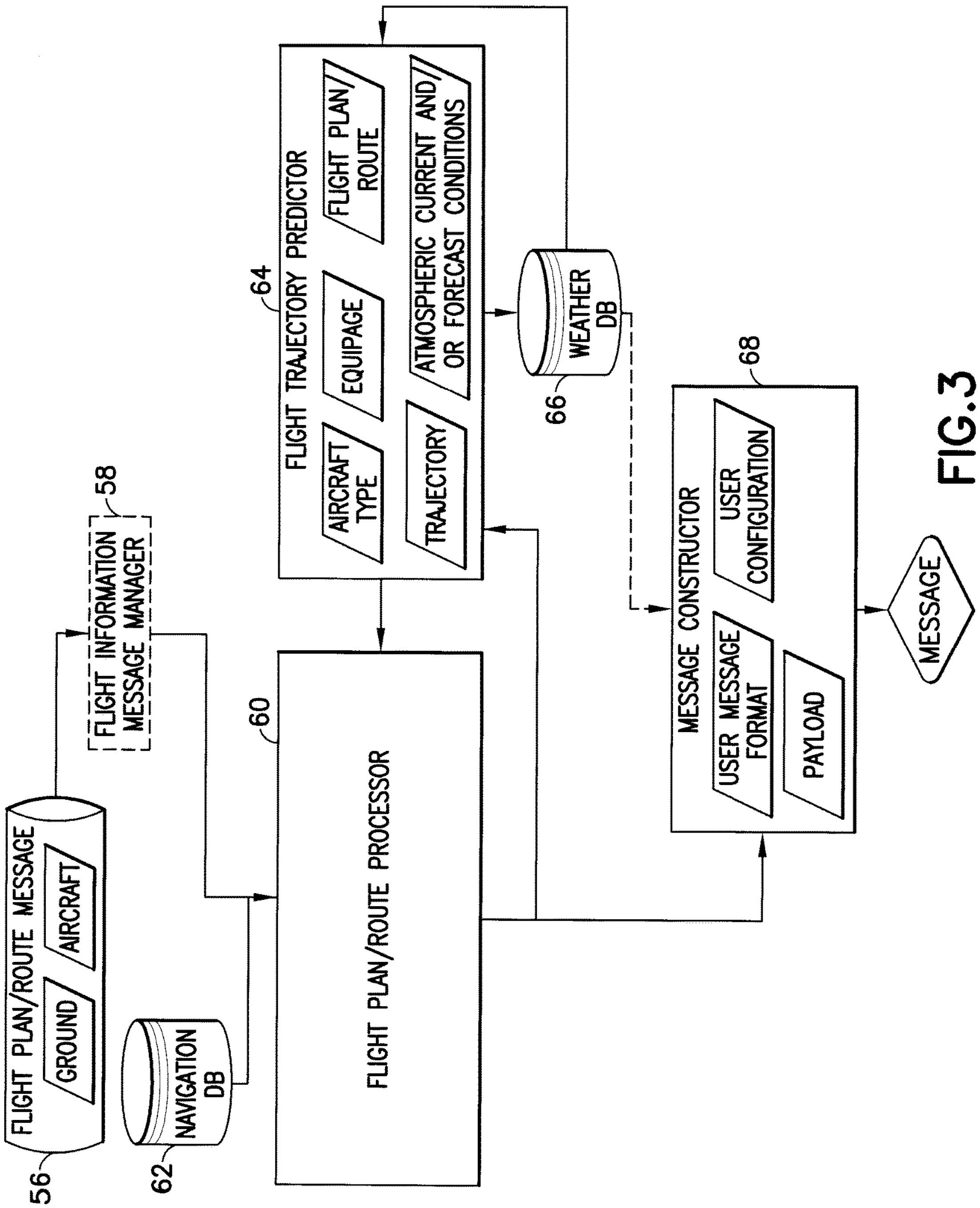
FIG. 3 is a block diagram showing a system for receiving a downlinked flight plan/route message, updating the flight plan/route in that message based at least in part on weather information, and then uplinking a message containing the updated flight plan/route in accordance with one embodiment.

FIG. 3 shows a ground-based system for receiving a flight plan/route message from a ground source or downlinked from an aircraft, updating the flight plan/route in that message based at least in part on weather information, and then uplinking a message containing the updated flight plan/route in accordance with one embodiment of the invention. The process or methodology begins with receiving a flight information message 56 from an aircraft or a ground source (e.g., an operations center). An aircraft or an operations center can transmit the flight plan/route in a variety of formats using a variety of methods. For example, a flight plan/route message can be transmitted from an aircraft via AGARS, ATN or some other aircraft datalink technology (e.g., broadband satellite IP). From ground sources, the message can be transmitted and received in any unique format specified by the user (e.g., an Aeronautical Operational Control datalink message type) or in a standardized ground messaging format (e.g., Type B).

The ground-based system seen in FIG. 3 optionally comprises a flight information message manager 58, which is a processor that receives an incoming flight information message 56. The flight information message manager 58 may be included for the purpose of optimizing the creation of a flight object, which is a generic container comprising a multiplicity of fields containing flight information, such as elements of flight plans, flight routes, flight trajectories, etc. The flight object may also contain associated aircraft state data such as weight, center of gravity, fuel remaining, etc. If configured, the flight information message manager 58 would process the flight information and pass the flight plan/route to the flight plan/route processor 60. If the flight information message manager 58 is not included in the configuration, the flight plan/route message would be passed directly to the flight plan/route processor 60.

In the case of using information retrieved from a navigation database 62, the flight plan/route processor 60 effectively converts (by decoding and translation) the flight plan/route information contained in the incoming message into a flight plan/route comprising a list of waypoints and associated flight information. The elements of the decoded and translated flight plan/route are stored in fields of the flight object, where they are available for use by the flight plan/route processor 60 and a flight trajectory predictor 64. The flight object may reside in a separate processor that manages the flight object.

In one example, after the list of waypoints representing the flight plan/route has been derived by the flight plan/route processor 60, it sends a message to the flight trajectory predictor 64 (or other subscriber-operated processor) informing the latter that the flight plan/route is available for processing. Alternatively, the flight plan/route processor 60 sends the flight object to the flight trajectory predictor or other subscriber-operated processor. In this alternative example, no message need be sent informing the subscriber that the flight object is ready for retrieval.

In the embodiment depicted in FIG. 3, the flight trajectory predictor 64 (which is also a processor) retrieves the sequence of waypoints making up the flight plan/route from the flight object and then calculates an updated predicted flight trajectory based on the flight plan/route, the original flight trajectory, the aircraft type and how it is equipped, and current and/or forecast environmental conditions. A system and method for generating a flight trajectory prediction is disclosed in U.S. Pat. No. 9,098,997, which disclosure is incorporated by reference herein in its entirety.

The flight trajectory predictor 64 may incorporate or communicate with a dynamic weather band processor of the type previously described with reference to FIG. 1. That dynamic weather band processor retrieves current and forecasted weather information associated with the original flight trajectory from a weather database 66. The flight trajectory predictor 64 also identifies aircraft state data and aircraft-observed weather information for the identified aircraft currently flying in accordance with the received flight plan/route. Next, the flight trajectory predictor 64 recalculates the original flight trajectory using the current and forecasted weather information and the aircraft-observed weather information to create an updated predicted flight trajectory with selected weather bands in the flight object.

The flight trajectory predictor 64 also causes the dynamic weather band processor (not shown in FIG. 3) to select current and forecasted weather information associated with the updated predicted flight trajectory from weather database 66 and then send the selected information to a message constructor 68, as indicated by the dashed arrow in FIG. 3. More specifically, environmental information, an aircraft identifier, security information and the positions corresponding to the environmental information go directly from the weather database 66 to the message constructor 68 for inclusion in a environmental information transmission.

As part of the trajectory prediction, flight trajectory predictor 64 can add and/or delete waypoints to the flight plan/route that is stored in the flight object, thereby creating a updated flight plan/route. In one example, the flight trajectory predictor 64 then sends a message to the flight plan/route processor 60 informing the latter that the updated predicted flight trajectory and new flight plan/route are available for use. In response to this message, the flight plan/route processor 60 retrieves the list of waypoints in the flight object representing the updated flight plan/route and uses that processed list of waypoints to construct a payload for inclusion in a flight plan/route message for transmission. Alternatively, the flight trajectory predictor 64 can send the flight object to the flight plan/route processor 60.

Upon completion of this process, the flight plan/route processor 60 sets a flag or sends a message to message constructor 68 indicating that the new flight plan/route and/or trajectory with selected weather bands are ready for transmission (i.e., uplinking). In another example, flight plan/route processor 60 accesses the latest updated flight plan/route in the flight object and determines an update was made by a subscriber and proceeds to process the updated information.

After the trajectory calculations, weather information processing and updated flight plan/route processing have been completed, the message constructor 68 can construct a flight plan/route message with or without a weather update message. In the case of a flight plan/route message, the message constructor 68 first constructs a message header and then constructs a message comprising that header, the flight plan/route payload received from the flight plan/route processor 60 and a cyclic redundancy check. The message is constructed in a message format specified by the message user in accordance with a dynamically settable user configuration stored in a user preferences database. This user configuration specifies which functions or processes are running in parallel, and also defines connections to receive and transmit the data from the processors or databases shown in FIG. 3. The user configuration also specifies the behavior of the application. The user message format generally pertains to the order and type of data and usually does not encompass the behavior of the application. The user message format is hard coded in the message constructor's logic or read from a dynamically settable user configuration required by the end user(s). Alternatively, if the user configuration is absent or unavailable, the system dynamically determines how to format the message based on the origin of the request, the type of information, the aircraft type, the airline operating the aircraft or other information. In either case, the message constructor 68 sends the constructed message to a transmitter (not shown) that will transmit the message to the proper address(es).

In the case of a weather update message, the message constructor 68 takes selected weather information from the weather database 66 and constructs an outgoing message for the end user(s) in a specified user message format. As part of the message construction process, the message constructor 68 encodes the weather information received from the weather database 66. In the case of a weather update message uplinked to an aircraft, the weather update is reviewed and accepted by the flight crew and then autoloaded into the flight management computer.

In the case of an updated flight plan/route message, the message constructor 68 takes the payload data representing the updated flight plan/route from the flight plan/route processor 60 and constructs an outgoing message for the end user(s) in a specified user message format. In the case of an updated flight plan/route message uplinked to an aircraft, the updated flight plan/route is reviewed and accepted by the flight crew and then the flight crew must contact Air Traffic Control to request clearance for the updated flight path.

The functionality of the flight plan/route processor 60 in accordance with one exemplary embodiment will now be described with reference to FIG. 4. For this example, the flight plan/route processor 60 receives an aircraft flight plan/route message 56 and other flight information 78 from a flight information message manager 58. The flight plan/route processor 60 also retrieves a user configuration 80 and a user message format 82 from a user preferences database. Then the flight plan/route processor 60 performs the functions of decoding and translating the incoming flight plan/route message, the result including a list of waypoints and associated flight information suitable for use in trajectory calculations and weather information processing as previously described. In particular, a new trajectory may be calculated by the trajectory predictor 64 which provides direct-to routings to downstream waypoints in the current flight plan/route, eliminating inefficient dog-legs in the en route phase of flight. The flight trajectory prediction processor may be programmed to take into account weather and air traffic control status (e.g., traffic sequence and flow and airspace constraints).

After a new trajectory has been calculated by the trajectory predictor 64, the flight plan/route processor 60 also performs the functions of translating and encoding an updated list of waypoints to construct a payload in a format suitable for inclusion in an updated flight plan/route message. The flight plan/route processor 60 utilizes the same methodology for processing an incoming aircraft message and an incoming ground message. However, while the methodology is the same, the conditions applied during the respective processes vary. The conditions may be modified through a dynamically settable user configuration or hardcoded into the logic. The general principle is that in whatever user message format the flight plan/route data is received, it needs to be decoded and translated before it can be used to determine an updated flight plan/route with or without environmental information.

Figure 4:
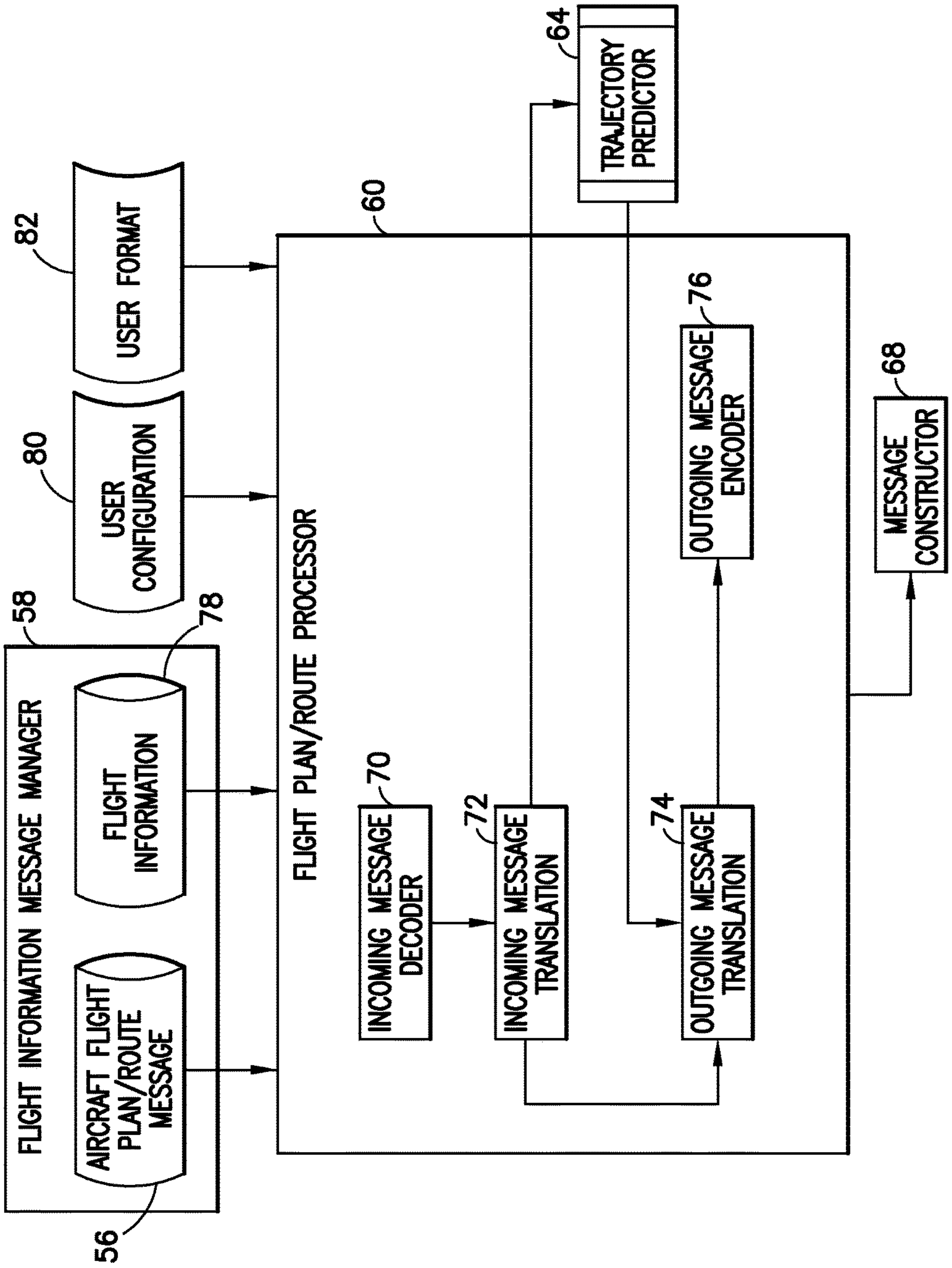
FIG. 4 is a diagram showing operations performed by a flight plan/route processor in accordance with the embodiment depicted in FIG. 3.

Still referring to FIG. 4, an incoming message is decoded by decoder 70 of the flight plan/route processor 60. The decoding scheme is a function of the user configuration and user message format. In a first decoding stage, the decoder 70 parses the message by separating the flight plan/route from other parts of the message. If the message was encrypted, then the decoder 70 will execute a second decoding stage in which the encrypted flight plan/route is decrypted. In the next decoding stage, the decoder 70 pulls (i.e., parses) data out of the flight plan/route and maps that data into applicable attribute fields of the flight object. In the last decoding stage, the decoder 70 converts user defined points such as latitude/longitude, floating waypoints, place bearing distance, or along track waypoints, intersections and airways and flight procedures into associated waypoints by internal computations or by reference to a navigation database (item 62 in FIG. 3), which stores navigation information pertaining to waypoints, airports, airways, and procedures and customer information. Information retrieved from the navigation database is again stored in the flight object.

For the particular embodiment shown in FIG. 4, the navigation information of greatest complexity is airways and flight procedures (e.g., departure and arrival procedures). When an airway or procedure is identified in the flight plan/route message, the decoder 70 uses that information to do a look up in the navigation database to query for additional data. For example, assume that the flight plan/route message identifies a standard instrument departure (SID) procedure, which consists of a number of waypoints or fixes and a climb profile. The decoder 70 uses the identified SID to query information in the navigation database. The navigation database query would return a listing of waypoints and possibly other associated data. All of the returned waypoints would be stored in the flight object.

An incoming message translator 72 of the flight plan/route processor 60 then continues the process by translating the waypoints stored in the flight object into a list of waypoints representing a proper flight plan/route. As part of this process, the incoming message translator 72 determines which of these waypoints are applicable and in which order. The correct ordering of the waypoints is determined from the content of the message and adaptive logic guidelines. For example, transition types indicating one method of movement from one point to the next can be derived from the message content. One example of a logic guideline may include, but is not limited to, the required security, FMC operations and limitations, aircraft state, current or predicted flight information, the aircraft type and/or the airline operating the aircraft. Optionally, duplicate or extraneous waypoints, or waypoints that have been passed by the aircraft since the time when the flight plan/route message was received, are generally not included in the final list of waypoints. The end result is a listing of waypoints representing a proper flight plan/route, stored in the flight object.

In accordance with one exemplary embodiment, the incoming message translator 72 of the flight plan/route processor 60 then sets a flag or sends a message to the flight trajectory predictor 64 (or other subscriber-operated processor) informing the latter that the flight plan/route is available in the flight object for processing. Alternatively, the flight plan/route processor 60 can send the flight object to the flight trajectory predictor 64 (or other subscriber-operated processor).

As part of the trajectory prediction, flight trajectory predictor 64 can add, reorder or delete waypoints to the flight plan/route that is stored in the flight object, thereby creating a new flight plan/route. The flight trajectory predictor 64 then sends a message to an outgoing message translator 74 of the flight plan/route processor 60 informing the outgoing message translator that the updated predicted flight trajectory and new flight plan/route are available for use. In response to this message, the outgoing message translator 74 combines the updated list of waypoints in the flight object to form a new flight plan/route by referring again to the navigation database (not shown in FIG. 4). In particular, the outgoing message translator 74 translates sequences of waypoints into airways and flight procedures that are added to the flight object. The outgoing message translator 74 takes into account the aircraft type, aircraft state data and the current location of the aircraft. For example, an identifier may identify multiple waypoints at different locations, and the outgoing message translator 74 will determine which of those waypoints was intended based on the present location of the aircraft and the flight intent trajectory information.

The translated waypoint fields in the flight object are then encoded by an outgoing message encoder 76 of the flight plan/route processor 60. More specifically, the encoder 76 parses the translated list of waypoints in the flight object and then encodes the parsed data to construct a payload for inclusion in a flight plan/route message to be uplinked. More specifically, the encoder 76 puts the parsed list of waypoints into the order required by a user-specified flight plan/route message format. The outgoing message encoder 76 will also identify the transition types (e.g., direct to or via). The transition type is crucial to the definition of the encoded outgoing message. It identifies how to transition between the various combinations of waypoints, airways, and procedures such as: waypoints to airways, airways to procedures, or waypoints to procedures. If requested by the user configuration or if the original downlinked message was decrypted, then the constructed payload will be encrypted by the encoder 76. Upon completion of the encoding process, the encoder 76 can either set a flag or send a message to message constructor 68 indicating that the new flight plan/route payload is ready for transmission (i.e., uplinking), or send updated flight plan/route payload directly to message constructor 68. The message constructor 68 then assembles all of the message components and formats the message for the end user.

The aircraft identifier and airline identifier in the flight information received by the flight plan/route processor 60 dictate what incoming message decoding/translating scheme should be used or the scheme can be declared in the user format. An instruction regarding what translating/encoding scheme should be used is sent to the outgoing message translator/encoder, as indicated by the arrow connecting blocks 72 and 74 in FIG. 4. The outgoing message translating/encoding scheme applied by the flight plan/route processor 60 will be a function of the applied decoding/translating scheme. These schemes take the form of subroutines retrieved from processor memory and executed by the flight plan/route processor 60.

For the sake of illustration, the operation of a flight plan/route processor will be described with respect to a particular flight plan of a particular aircraft. In this example, an aircraft flight message is received, such as:

FPN/RI:DA:KSEA:AA:KLAX:R:04O:D:SID12:F: ABC.J12.WPT1. V140..WPT9:A:STAR2.TRANS (18O).

The meaning and ordering of particular symbols and characters appearing in this specific exemplary flight message are dictated by the applicable user specifications and will be different for other flight messages constructed in accordance with different user specifications. Therefore the detailed discussion of this specific exemplary message is not intended to limit the scope of the invention, in which the flight plan/route processor can be programmed to handle flight messages in different formats. In this example, the coding is as follows: FPN=Flight Plan; RI=Inactive Route; DA=Departure Airport; AA=Arrival Airport; R=Departure Runway; D=Departure Procedure; F=First Enroute Waypoint; A=Arrival Procedure. In addition, a single period means Via Transition and a double period means Direct To.

The route format of this exemplary message is not useable for trajectory and weather calculations. It must be decoded and translated. The conditions applied during decode and translation of an incoming message vary per aircraft type, the aircraft state data which was derived from the flight information, or associated data derived from the route data itself (e.g., leg types).

The above incoming aircraft message when decoded would look similar to the following:

Route Seattle-Tacoma Airport to Los Angeles airport via runway 04 to standard instrument departure SID12 to en route waypoint ABC then via jet airway J12 to WPT1 then via victor airway V140 to WPT9 then TRANS transition to the standard terminal arrival route STAR2 to runway 18.

This initial decode is still unusable for trajectory calculations and for weather processing. The route must be decoded and translated into a waypoint to waypoint type of route with the associated data (e.g., known leg types, altitude constraints, etc.). Therefore, an additional operation is required in the decoding operation due to the specification of the route consisting of more than waypoint to waypoint routing (i.e., the route contains airways, a STAR, etc.). The SID12 would be expanded to WPTA, WPTB, WPTC, ABC and WPTY. The jet airway J12 would expand to ABC, DEF, GHI, and WPT1. The victor airway V140 would consist of WPT1, WPT7, WPT8, and WPT9. The transition TRANS would consist of only the fix TRANS. The STAR2 terminal arrival route identifies the arrival route into KLAX, which consists of waypoints WPT15, WPT16, WPT17, WPT18 and WPT22.

The initial breakdown of each element within the message during decoding would look as follows:

KSEA→KSEA
04O→RWY04
SID12→WPTA, WPTB, WPTC, ABC, WPTY
ABC→ABC
J12→ABC, DEF, GHI, WPT1
WPT1→WPT1
V140→WPT1, WPT7, WPT8, WPT9
WPT9→WPT9
TRANS→TRANS
STAR2→WPT15, WPT16, WPT17, WPT18, WPT22
18O→RWY18
KLAX→KLAX

The final decode of the aircraft message would look like the following list: KSEA RWY04, WPTA, WPTB, WPTC, ABC, WPTY, ABC, ABC, DEF, GHI, WPT1, WPT1, WPT1, WPT7, WPT8, WPT9, WPT9, TRANS, WPT15, WPT16, WPT17, WPT18, WPT22, and KLAX RWY18.

The decoded message is then translated. Translation may include the deletion of duplicate or extraneous waypoints or waypoints that have been passed by the aircraft since the time when the flight plan/route message was received. At the completion of this operation, the incoming flight plan/route is processed and the list of waypoints may be used for trajectory, weather or other processing. The decoded and translated flight plan/route might look like what follows, again dependent on the conditions, yet representative of the actual flight: KSEA RWY04, WPTA, WPTB, WPTC, ABC, DEF, GHI, WPT1, WPT7, WPT8, WPT9, TRANS, WPT15, WPT16, WPT17, WPT18, WPT22, and KLAX RWY18.

After the trajectory, weather or other processing, the next operation is to translate and encode the trajectory or updated flight plan/route and/or the selected weather bands into an outgoing message for transmission to a user or users. The process of translating the flight plan/route is determined by a user configuration (80 in FIG. 4) or hard-coded logic and could involve correlating the list of waypoints to standard instrument departures, airways, standard terminal arrival routes, approach procedures, etc. In another example with a different configuration, the translator may simply output a list of waypoints. Once the outgoing message translation is complete, the outgoing encoder constructs a payload for a flight plan/route uplink message in accordance with the same encoding used to encode the original received message.

There are no existing systems which dynamically encode the flight plan/route message for transmission. Also there is no existing solution that performs the decoding/translation of an incoming flight plan/route message. This invention provides a new opportunity to decode and translate an incoming flight plan/route message as well as translate and encode it for an outgoing message. This method also provides a capability to perform such processing based on a user configuration which can be dynamically set. Alternatively, if the user configuration is absent or unavailable, the system dynamically determines how to format the message based on the origin of the request, the type of information, the aircraft type, the airline operating the aircraft or other information.

While the invention has been described with reference to various embodiments, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. Therefore it is intended that the invention not be limited to the particular embodiment disclosed as the best mode contemplated for carrying out this invention.

As used in the claims set forth hereinafter, making a message available means transmitting the message or storing the message for retrieval. The method claims set forth hereinafter should not be construed to require that all operations of the method be performed in alphabetical order or in the order in which they are recited.

The invention claimed is:

1. A method for flying an aircraft in accordance with a flight plan/route, comprising:

(a) obtaining a flight plan/route message comprising first payload data representing a flight plan/route of an aircraft;

(b) processing the first payload data to derive a list of waypoints and associated flight information in a form suitable for use by a user;

(c) processing the list of waypoints, associated flight information, and current and forecast environmental information to derive second payload data representing an updated flight plan/route of said aircraft;

(d) constructing an updated flight plan/route message that includes said second payload data;

(e) uplinking said updated flight plan/route message to said aircraft with or without environmental information; and (f) flying the aircraft in accordance with said uplinked updated flight plan/route, wherein steps (a) through (e) are performed by one or more processors not located onboard said aircraft.

2. The method as recited in claim 1, wherein said first payload data is encrypted, and operation (b) comprises decrypting said first payload data, and operation (c) comprises encrypting said second payload data.

3. The method as recited in claim 1, wherein operation (b) comprises decoding some of said first payload data into waypoints based at least in part on information retrieved from a navigation database.

4. The method as recited in claim 3, further comprising storing said list of waypoints in a flight object and translating said list of waypoints in said flight object from a form not suitable for use by a user to a form suitable for use by said user.

5. The method as recited in claim 1, wherein operation (c) comprises translating waypoints included in said list into an identifier of an airway or flight procedure by reference to a navigation database, further comprising storing said identifier in an appropriate field of a flight object.

6. The method as recited in claim 5, wherein operation (c) further comprises encoding waypoints, airways, flight procedures and other flight information in accordance with a pre-specified format for message payload data.

7. The method as recited in claim 1, wherein operations (b) and (c) respectively involve decoding and encoding schemes which are a function of an aircraft type for said aircraft or an airline operating said aircraft.

8. The method as recited in claim 1, wherein operations (b), (c) and (d) are performed as a function of user preference data.

9. A system for processing flight information, comprising a flight management system onboard an aircraft and a ground-based data processing system, wherein the ground-based data processing system is programmed to perform the following operations:

(a) obtaining a flight plan/route message comprising first payload data representing a flight plan/route of an aircraft;

(b) processing the first payload data to derive a list of waypoints and associated flight information in a form suitable for use by a user;

(c) processing the list of waypoints, associated flight information, and current and forecast environmental information to derive second payload data representing an updated flight plan/route of said aircraft;

(d) constructing an updated flight plan/route message that includes said second payload data; and (e) uplinking said updated flight plan/route message to said flight management system onboard said aircraft with or without environmental information, and wherein said flight management system is configured to control flight of said aircraft in accordance with said updated flight plan/route.

10. The system as recited in claim 9, wherein said first payload data is encrypted, and operation (b) comprises decrypting said first payload data, and operation (c) comprises encrypting said second payload data.

11. The system as recited in claim 9, wherein operation (b) comprises decoding some of said first payload data into waypoints based at least in part on information retrieved from a navigation database.

12. The system as recited in claim 11, further comprising storing said list of waypoints in a flight object and translating said list of waypoints in said flight object from a form not suitable for use by a user to a form suitable for use by said user.

13. The system as recited in claim 9, wherein operation (c) comprises translating waypoints included in said list into an identifier of an airway or flight procedure by reference to said navigation database, further comprising storing said identifier in an appropriate field of a flight object.

14. The system as recited in claim 13, wherein operation (c) further comprises encoding waypoints, airways, flight procedures and other flight information in accordance with a pre-specified format for message payload data.

15. The system as recited in claim 9, wherein operations (b) and (c) respectively involve decoding and encoding schemes which are a function of an aircraft type for said aircraft or an airline operating said aircraft.

16. The system as recited in claim 1, wherein operations (b), (c) and (d) are performed as a function of user preference data.

17. A system for processing flight information comprising a flight management system onboard an aircraft and the following components not onboard the aircraft: a flight object, a trajectory predictor, a message constructor, a navigation database, and a flight plan/route processor capable of communicating with said navigation database, said trajectory predictor, said message constructor, said flight plan/route processor, and said flight object, wherein said flight plan/route processor is programmed to perform the following operations:

(a) obtaining a flight plan/route message comprising payload data representing a flight plan/route of an aircraft;

(b) parsing said payload data to extract flight information;

(c) decoding components of said extracted flight information to derive a list of waypoints and associated flight information; and (d) storing said list of waypoints and associated flight information in said flight object; and wherein said trajectory predictor is configured to process said list of waypoints, associated flight information, and current and forecast environmental information to derive payload data representing an updated flight plan/route of said aircraft;

wherein said message constructor is configured to construct an updated flight plan/route message that includes said payload data representing said updated flight plan/route of said aircraft and uplink said updated flight plan/route message to said aircraft with or without environmental information; and wherein said flight management system is configured to control flight of said aircraft in accordance with said updated flight plan/route.

18. The system as recited in claim 17, wherein at least one of the waypoints included in said stored list of waypoints was not explicitly identified in said payload data and instead was retrieved from said navigation database.

19. A system for processing flight information comprising a flight management system onboard an aircraft and a ground-based data processing system not onboard said aircraft, wherein the data processing system comprises:

a flight object that stores a list of waypoints associated with a flight plan/route of an aircraft;

a flight plan/route processor capable of communicating with a navigation database and said flight object, wherein said flight plan/route processor is programmed to perform the following operations:

(a) translating said list of waypoints into a sequence of flight information comprising waypoints, flight levels, fixes, transitions, airways and flight procedures, said sequence of flight information representing said flight plan/route for said aircraft; and (b) encoding said sequence of flight information to have a specified format associated with said aircraft or an airline operating said aircraft;

a trajectory predictor configured to process said encoded sequence of flight information and current and forecast environmental information to derive payload data representing an updated flight plan/route of said aircraft;

a message constructor configured to perform the following operations:

(c) constructing a flight plan/route message that includes said payload data representing said updated flight plan/route of said aircraft; and (d) transmitting said flight plan/route message to said aircraft with or without environmental information; and wherein said flight management system is configured to control flight of said aircraft in accordance with said updated flight plan/route.

* * * * *